Aug. 25, 1953     E. M. HAWKINS     2,650,063
GRUBBER
Filed Dec. 19, 1950     3 Sheets-Sheet 1
FIG. 1
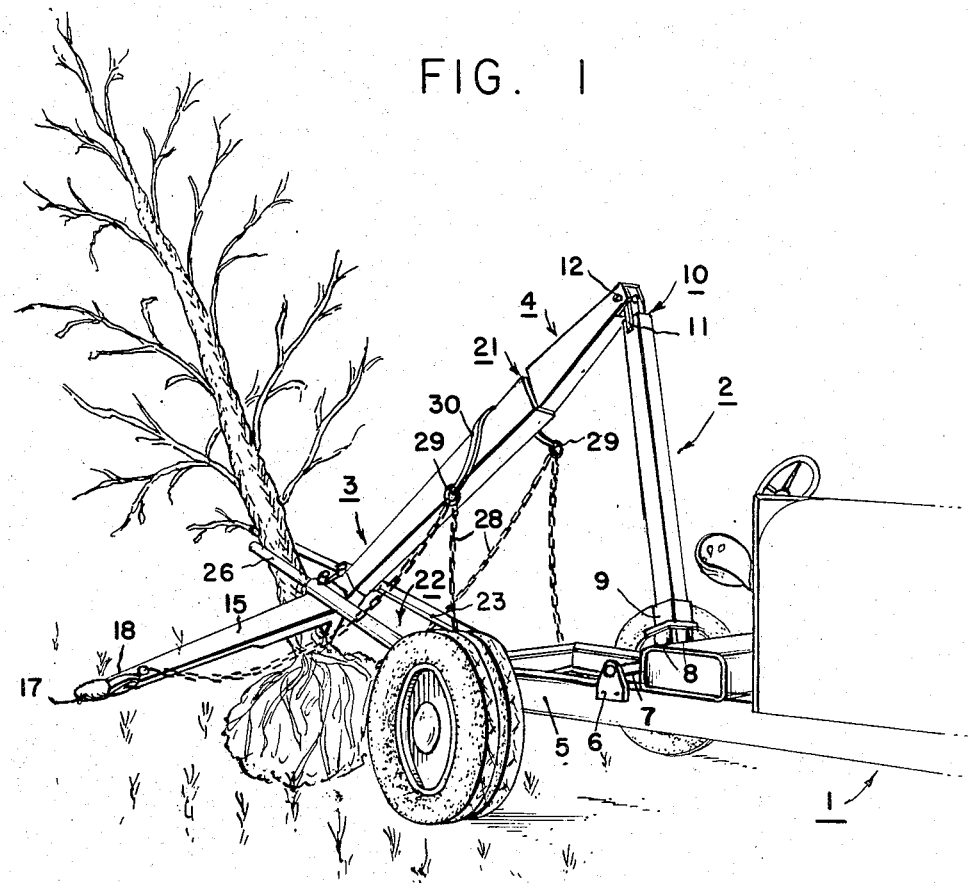
FIG. 8
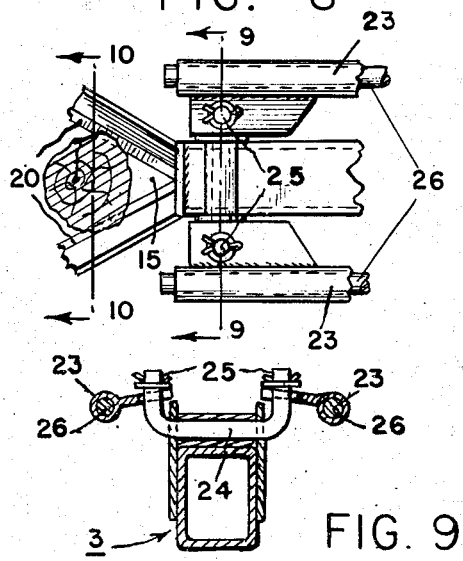
FIG. 10
FIG. 9
Inventor
EDWARD M. HAWKINS,
His Attorney

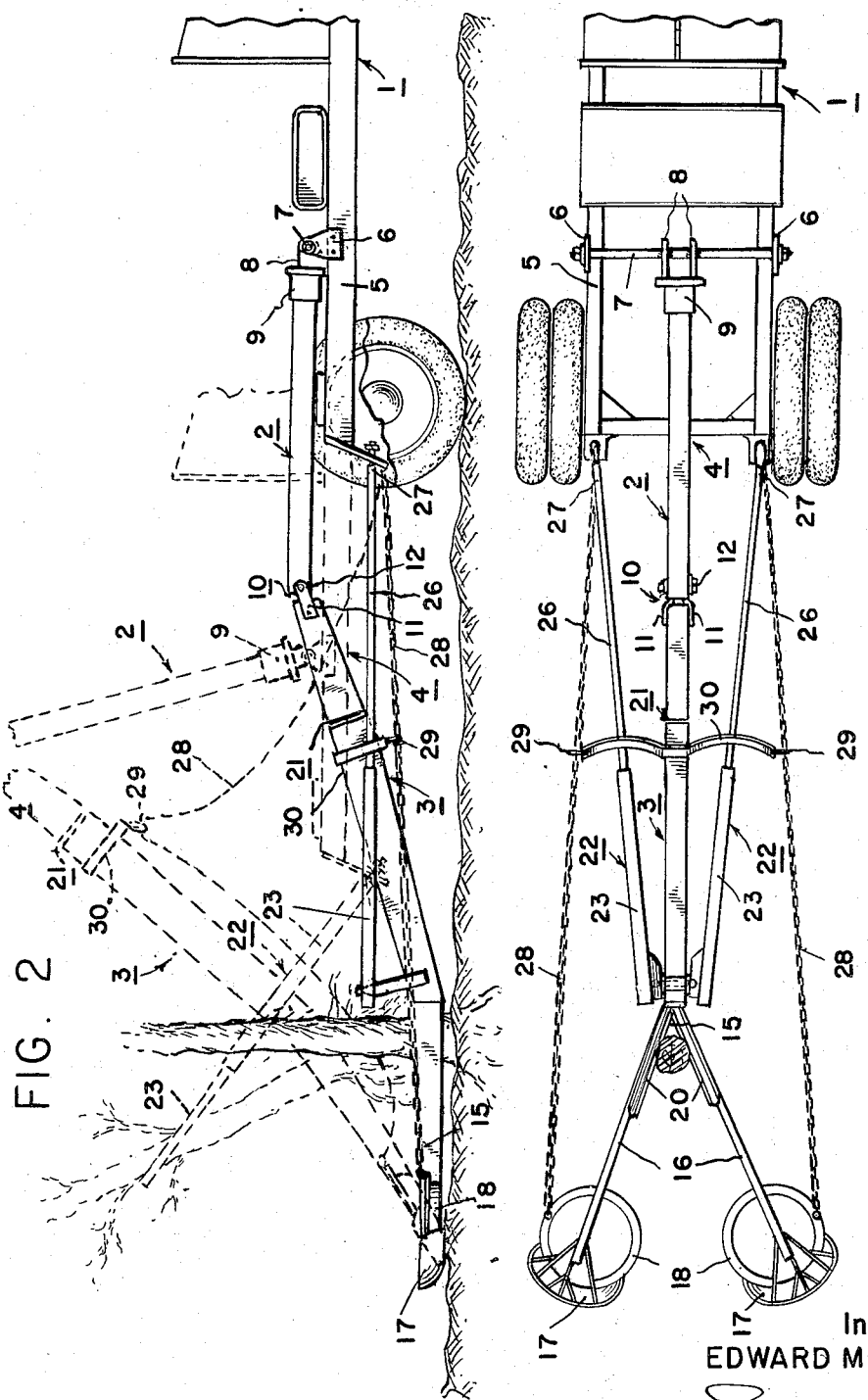

Aug. 25, 1953  E. M. HAWKINS  2,650,063
GRUBBER
Filed Dec. 19, 1950  3 Sheets-Sheet 3
FIG. 4
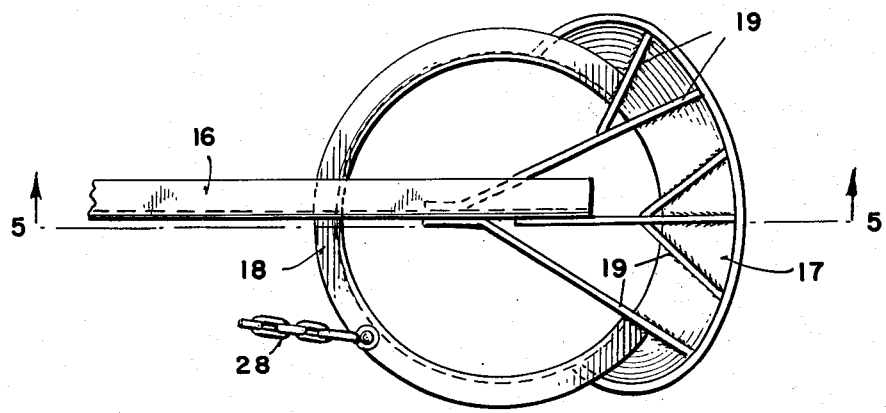
FIG. 5
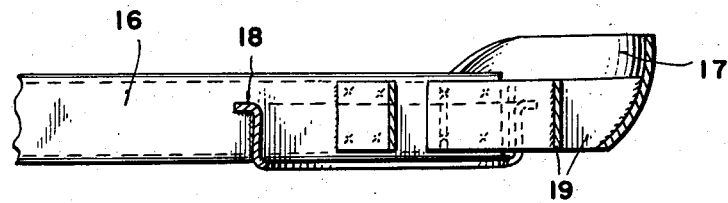
FIG. 6
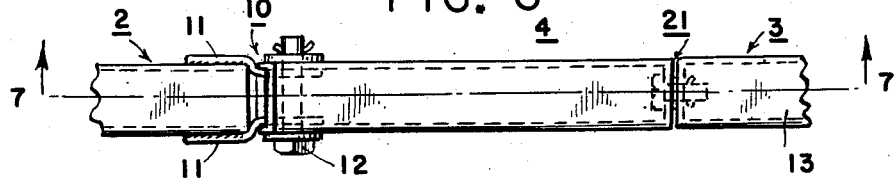
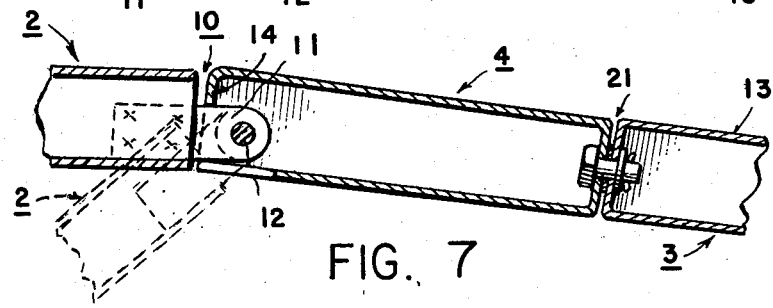
FIG. 7
Inventor
EDWARD M. HAWKINS,
By
his Attorney Patented Aug. 25, 1953

2,650,063

UNITED STATES PATENT OFFICE 2,650,063

GRUBBER

Edward M. Hawkins, Forest, Va.

Application December 19, 1950, Serial No. 201,630

10 Claims. (Cl. 254—132)

This invention relates to grubbing devices and particularly to grubbers for trees and the like, which are adapted to be mounted on a truck, tractor or other self-propelled vehicle.

In uprooting trees of good size, it has heretofore been the practice to push or pull the tree over or to lift the tree bodily out of the ground. Grubbers of the latter type, to which the present invention is directed, are usually truck- or tractor-mounted power hoists. Supported entirely by the vehicle on which they are mounted, such hoists must be extremely rugged and heavily braced to uproot even relatively small trees and are of little value on trees of good size. The latter, consequently, are usually removed by the time-honored process of blasting their stumps after the trees have been cut down.

It is the primary object of the present invention to provide an improved grubber which is readily mountable on a truck or like vehicle, whereby even a light truck is enabled to uproot trees of large size.

Another object of the invention is to provide an improved grubber which is powered merely by moving the truck to which it is attached and requires neither hydraulic nor other special lifting mechanism.

An additional object of the invention is to provide an improved grubber, wherein the lifting element is a ground-fulcrumed lever of the second class to which force is applied through a linkage by movement of the truck on which the grubber is mounted.

A further object of the invention is to provide a ground-fulcrumed grubber for attachment to trucks and the like, having means for adjusting itself to the ground surface whereby the grubber is enabled to act effectively regardless of surface irregularities.

Other objects and advantages of the invention will appear hereinafter in the detailed description, be particularly pointed out in the appended claims and illustrated in the accompanying drawings, in which:

Figure 1 is a perspective view of a preferred embodiment of the grubber of the present invention, showing the grubber mounted on the back of a truck with its parts in the relative positions assumed at the final stage of a grubbing operation;

Figure 2 is a side elevational view of the grubber of Figure 1, showing the relative positions of the parts of the grubber at the start and, in broken line, at intermediate stages of a grubbing operation;

Figure 3 is a plan view of the grubber of Figure 2;

Figure 4 is a fragmentary plan view on an enlarged scale of one of the ground-supported skids;

Figure 5 is a horizontal sectional view, taken along the lines 5—5 of Figure 4;

Figure 6 is a fragmentary plan view on the scale of Figure 4 of the hinged joint of the grubbing beam;

Figure 7 is a horizontal sectional view, taken along the lines 7—7 of Figure 6;

Figure 8 is a fragmentary plan view on an enlarged scale, showing in detail the tree-engaging portion of the grubber;

Figure 9 is a vertical sectional view, taken along the lines 9—9 of Figure 8; and Figure 10 is a vertical sectional view, taken along the lines 10—10 of Figure 8.

Referring now in detail to the drawings in which like reference characters designate like parts, the improved grubber of the present invention is adapted to be mounted on a truck, tractor or other self-propelled vehicle 1, hereinafter termed a "truck," only the pertinent portion of the latter being shown. As its grubbing element, the grubber has a beam or shaft 2, formed of a pair of hingedly connected parts, one a lever arm or member 3 and the other a link arm or member 4.

Of the above arms, the link arm 4 is adapted to be pivotally mounted on or attached to the frame 5 of the truck for pivoting or swinging relative thereto about a horizontal axis. In the illustrated embodiment, this is accomplished through a pair of transversely spaced brackets 6 upstanding from the frame 5 and journalling a cross-shaft 7 to which are welded or otherwise secured, intermediate the brackets, spaced lugs 8 of a header 9 affixed to the inner end of the link arm 4.

The other or outer end of the link arm 4 is hingedly connected to the adjacent or inner end of the lever arm 3 through a knee joint 10, such that when force is applied to the inner end of the link arm against sufficient resistance, the beam 2, under this load, will automatically break, buckle, jack-knife or bend upwardly at the hinge, thereby lifting or raising the inner end of the lever arm. To this end, the arms are connected for hinging about a horizontal axis and their joint is maintained or held above a base line drawn between their opposite extremities, at or below which automatic buckling would not occur. While obtainable by a piano or like hinge, the desired connection is made in the illustrated embodiment by a pair of transversely spaced lugs or ears 11, fixed to and projecting rearwardly of the outer end of the link arm 4 and rotatably or pivotally embracing or engaging a connecting pin 12 extending transversely through the lever arm 3. If, as here, the link arm and the adjoining portion of the lever arm are of box section, the underside of the lever arm is slotted to accommodate the range of movement of the ears. With this construction, the desired upward angular disposition of the arms relative to the aforementioned base line is obtained by securing to the inner face of the upper web 13 of the lever arm, above the connecting or pivot pin 12, an abutment, boss or stop 14 which, when the arms, 3 and 4, are in their normal or extended position, rests on or abuts the upper edges of the ears 11.

Outwardly or rearwardly of the knee joint 10, the box section of the lever arm 3 terminates in a crotch or fork 15 of the V-shaped outer portion of the arm, this being formed by the inner or connected ends of a pair of transversely forked or divergent fingers 16. These fingers, in turn, terminate in, or carry at their outer ends, shoes or skids 17, outwardly, round-surfaced or arcuately convex and backed by reinforcing rings 18, to which the shoes are welded or otherwise rigidly secured, each of the shoes and its associated ring being secured in like manner and these end structures preferably being further reinforced by ribs 19. Designed to embrace or straddle and grip a tree, a stump or like growth, to be uprooted, hereinafter termed "tree," the fingers 16 in the vicinity of the crotch 15 have inturned confronting sharp-edged grippers or jaws 20 which, by biting into the trunk of the tree, provide a firm grip for application of force.

With the lever arm 3 adapted to ride or slide over the ground on its rounded skids 17 and, inwardly thereof, to grip a tree between the jaws 20, and force applicable to the inner end of the arm at the knee joint 10 through the link arm 4, the lever arm acts as a lever of the second class, fulcrummed on the ground over the extended bearing area provided by the skids 17, the latter thus distributing the load and preventing the outer ends of the fingers from sinking into the ground. Consequently, as the lever arm is rocked about its rounded skids in uprooting a tree, its load is not carried solely by the truck, as in usual truck-mounted grubbers, but is distributed between the truck and the ground and its effective force is limited only by the relative lengths of its force and resistance arms and the motive power of the truck on which it is mounted. Thus, in practice, the grubbing device of the present invention has enabled a light truck to uproot trees of as much as ten inches in diameter.

To ensure that both of the skids 17 will rest on the ground during uprooting and thereby prevent twisting of the beam 2 if the ground is not level, the lever arm 3 has a swivel joint 21 intermediate the knee joint 10 and the crotch 15, permitting the outer portion of the lever arm to swivel or turn as necessary about its longitudinal axis without affecting the relation of the lever and link arms at the knee joint.

Not only is the grubber of the present invention effective in uprooting trees, but it is also employable for moving the uprooted trees off the land. For this purpose, the lever arm 3 is connected above the crotch 15 to the truck frame 5 by a pair of telescoping legs 22. Each of these legs is formed of a tube 23 connected to the lever arm, for pivoting about both horizontal and vertical axes relative thereto, by a U-shaped connecting bar 24 extending through and rotatable relative to the lever arm, to the upturned outer ends 25 of which the tubes are pivotally connected. The other element of each of the telescoping legs is a rod 26, slidably or telescopingly received within its related tube 23 and having its inner end 27 swingably attached to the truck frame 5, thereby permitting the tubes readily to follow the aforementioned swivelling of the outer portion of the lever arm. Normally extended, the legs 22 telescope as the beam 2 breaks upwardly at the knee joint 10 until the tubes 23 are stopped by the inner ends 27 of the rods 26, thus limiting the extent to which the beam can break. This occurring after a tree has been uprooted, the legs act as push rods on further backing of the associated truck to hold the lever arm 3 away from the truck and, at the same time, maintain its tilt, thus enabling the grubber to carry the tree while being skidded on its shoes 17 to a disposal area. The inward divergence outwardly of the rods 26 beyond the lever arm 3 on telescoping of the legs 22, resulting from the greater spacing of the legs at the truck than at the connecting bar 24, is employed both to prevent the tree from falling sideways during uprooting and steady it as it is carried to the disposal area.

While the swivelling of the outer portion of the beam 2 as it rides over uneven ground minimizes the transverse stresses on its several connections, the possibility of such stressing preferably is further reduced by connecting each of the reinforcing rings 18 to the frame 5 through a guide chain 28. To avoid interference with the other parts of the grubber during operation of the latter, these chains are led intermediate their ends through guides 29 in a spreader 30 carried by the inner portion of the lever arm 3.

With a grubber constructed in the above manner, a grubbing operation is reduced to sliding the fingers 16 about a tree until the latter is firmly gripped between the jaws 20. Further movement of the truck 1 toward the tree then breaks the beam 2 at the knee joint 10 and lifts or raises the hinged inner end of the lever arm 3 through the link arm 4, causing the lever arm to fulcrum on the ground about the shoes 17 and uprooting the tree, the rods 26, in process, steadying the tree and holding it substantially upright. To obtain maximum lift, it is, of course, desirable that the beam 2 be almost straight in normal position and that it break only after a tree has been gripped. This is ensured in the illustrated embodiment by holding the angular deflection of the beam at the knee joint to a minimum consistent with automatic upward breaking, such that the weight of the beam will, itself, hold the arms in normal position despite any small obstacles encountered by the skids 17 as they are slid over the ground.

It has been mentioned that uprooting or grubbing is accomplished by movement of a truck toward a tree. Although this movement could as well be forward as backward, the latter is preferred since it enables the grubber readily to be dragged on its skids behind a truck, without possibility of buckling as the truck is moved between locations.

From the above detailed description, it will be apparent that there has been provided an improved grubbing device which is particularly adapted for mounting on trucks and when so mounted affords adequate leverage for even light trucks to uproot trees of relatively large size. It should be understood that the described and disclosed embodiment is merely exemplary of the invention and that all modifications are intended to be included which do not depart either from the spirit of the invention or the scope of the appended claims.

Having described my invention, I claim:

1. A grubber for trucks comprising a beam having an inner end pivotally attached to a truck and an outer end contacting the ground, said beam being hinged intermediate its ends, means for maintaining the hinge point of said hinge above a line drawn between the contact point of said beam with the ground and its pivot point with said truck, and force-transmitting means on said beam between said outer end and said hinge point, said beam breaking upwardly on application of force to said pivoted inner end.

2. A grubber for trucks comprising a lever arm, a link arm hingedly connecting an inner end of said lever arm to a truck, said lever arm having a fork toward an outer end thereof for gripping a tree therebetween and contacting the ground therebeyond, means for causing said arms to break upwardly at their hinged connection under load, and means associated with said arms for limiting the breaking thereof.

3. A grubber for trucks comprising a lever arm, a link arm hingedly connecting an inner end of said lever arm to a truck, said lever arm having a fork toward an outer end thereof for gripping a tree therebetween and contacting the ground therebeyond, means for causing said arms to break upwardly at their hinged connection under load, and telescoping means associated with said arms for limiting the breaking thereof.

4. A grubber for trucks comprising a lever arm, a link arm having one end hingedly connected to said lever arm and an opposite end pivotally mounted on a truck, said lever arm having a fork toward an outer end for gripping a tree therebetween, skid means on said lever arm outwardly of said fork and resting on the ground for fulcruming said lever arm thereon, swivel means on said lever arm for angularly adjusting said skid means to the ground surface, and means associated with said hinged connection for maintaining the hinge point thereof above a line drawn between the ground- and truck-contacting extremities of said arms.

5. A grubber for trucks comprising a lever arm, a link arm having one end connected to said lever arm by an upwardly breaking hinge and an opposite end pivotally mounted on a truck, said lever arm having a fork toward an outer end for gripping a tree therebetween, skid means on said lever arm outwardly of said fork and resting on the ground for fulcruming said lever arm thereon, swivel means on said lever arm for angularly adjusting said skid means to the ground surface, and telescoping means embracing said lever arm adjacent said fork and movably connecting said arm to said truck, said telescoping means projecting above said fork on upward breaking of said arms and limiting the breaking thereof.

6. A grubber for trucks comprising a lever arm, a link arm having one end connected to said lever arm by an upwardly breaking hinge and an opposite end pivotally mounted on a truck, said lever arm having a fork toward an outer end for gripping a tree therebetween, skid means on said lever outwardly of said fork and resting on the ground for fulcruming said lever arm thereon, and telescoping means embracing said lever arm adjacent said fork and movably connecting said arm to said truck, said telescoping means projecting above said fork on upward breaking of said arms and limiting the breaking thereof.

7. A grubber for trucks comprising a lever arm, a link arm hingedly connected adjacent opposite extremities to a truck and to an end of said lever arm, a pair of outwardly divergent forked fingers forming an outer portion of said lever arm and having confronting tree-gripping jaws adjacent the fork thereof, ground-contacting skid means carried by outer ends of said fingers, means for causing said arms to break upwardly at the hinge point thereof on application of force to said link arm, and telescoping means extending between and connecting said lever arm adjacent said fork and said truck, said telescoping means being projected above said jaws on upward breaking of said arms and limiting the breaking thereof.

8. A grubber for trucks comprising a lever arm, a link arm hingedly connected adjacent opposite extremities to a truck and to an end of said lever arm, a pair of outwardly divergent forked fingers forming an outer portion of said lever arm and having confronting tree-gripping jaws adjacent the fork thereof, ground-contacting skid means carried by outer ends of said fingers, means for causing said arms to break upwardly at the hinge point thereof on application of force to said link arm, and telescoping means embracing said lever arm adjacent said fork and connecting said arm to said truck, said telescoping means converging outwardly of said truck and being projected above said fork on upward breaking of said arms and limiting the breaking thereof.

9. A grubber for trucks comprising a lever arm, a link arm hingedly connected adjacent opposite extremities to a truck and to an end of said lever arm, a pair of outwardly divergent forked fingers forming an outer portion of said lever arm and having confronting tree-gripping jaws adjacent the fork thereof, ground-contacting skid means carried by outer ends of said fingers, means enabling said arms to break upwardly at the hinge point on application of force to said link arm, and telescoping means extending between and connecting said lever arm adjacent said fork to said truck, said telescoping means being projected above said jaws on upward breaking of said arms at said hinge for limiting the breaking thereof.

10. A grubber for trucks comprising a lever arm having a forked outer portion and a ground-contacting outer end, a link arm connected to an inner end of said lever arm by an upwardly breaking hinge adjacent one extremity and to a truck adjacent an opposite extremity, a swivel joint in said lever arm intermediate said forked outer portion and said hinged connection to said link arm for enabling said outer portion to swivel about its longitudinal axis, and a pair of spaced outwardly converging telescoping legs embracing and universally connected to said lever arm adjacent the fork of said outer portion, said legs having inner ends connected to said truck and telescoping on upward breaking of said arms at said hinge for limiting the breaking thereof.

EDWARD M. HAWKINS.

References Cited in the file of this patent

UNITED STATES PATENTS

| Number | Name | Date |
|---|---|---|
| 1,043,223 | Grady | Nov. 5, 1912 |
| 1,393,955 | Monk | Oct. 18, 1921 |
| 2,361,690 | Hunz | Oct. 31, 1944 |
| 2,505,923 | Taylor et al. | May 2, 1950 |